(12) United States Patent
Yamada et al.

(10) Patent No.: US 6,661,108 B1
(45) Date of Patent: Dec. 9, 2003

(54) HYBRID DRIVE DEVICE

(75) Inventors: Jun Yamada, Ageo (JP); Yoshiaki Yamada, Ageo (JP); Yoshito Watanabe, Ageo (JP); Masakazu Sasaki, Ageo (JP)

(73) Assignee: Nissan Diesel Co., Ltd., Saitama (JP)

( * ) Notice: Subject to any disclaimer, the term of this patent is extended or adjusted under 35 U.S.C. 154(b) by 0 days.

(21) Appl. No.: 09/868,233

(22) PCT Filed: Mar. 24, 1999

(86) PCT No.: PCT/JP99/01494

§ 371 (c)(1),
(2), (4) Date: Aug. 20, 2001

(87) PCT Pub. No.: WO00/37278

PCT Pub. Date: Jun. 29, 2000

(30) Foreign Application Priority Data

Dec. 18, 1998 (JP) .............................................. 10-360483

(51) Int. Cl.$^7$ ............................. F02D 29/06; H02J 7/00; H02P 1/00; B60L 11/00
(52) U.S. Cl. ...................... 290/40 C; 320/118; 318/139; 701/22
(58) Field of Search ................................. 290/16, 40 C, 290/30 R; 320/116, 118; 318/139; 324/426; 701/22; 180/65.2, 65.3, 65.4

(56) References Cited

U.S. PATENT DOCUMENTS 5,563,454 A * 10/1996 Araki et al. .............. 290/38 R
6,047,787 A * 4/2000 Deng et al. ................... 290/16

FOREIGN PATENT DOCUMENTS

| GB | 2319407 A | * 5/1998 | ............. B60L/3/00 |
| JP | 6-209501 | 7/1994 | |
| JP | 10-094182 | 4/1998 | |
| JP | 10-108304 | 4/1998 | |
| JP | 10-108361 | 4/1998 | |
| JP | 10-174210 | 6/1998 | |
| JP | 10-178705 | 6/1998 | |
| WO | WO 9747491 A1 | * 12/1997 | ............. B60L/3/00 |

* cited by examiner

Primary Examiner—Nestor Ramirez
Assistant Examiner—Guillermo Perez
(74) Attorney, Agent, or Firm—Rabin & Berdo, P.C.

(57) ABSTRACT

In a hybrid drive device which drives an electrical motor with electrical power from a storage device and/or from a generator driven by an engine, a secondary battery is generally used as the storage device. However, the storage device must be replaced at fixed intervals due to a short battery life. In addition, the low charging/discharging efficiency of a secondary battery limits improvements in fuel economy of the drive device. The present invention avoids these shortcomings by providing a storage device that includes a condenser bank with a plurality of condenser cells connected in series, parallel monitors which are connected in parallel to each condenser cell and which bypasses the charging current when the respective terminal voltages exceed a fixed value, and a switching converter with fixed current output characteristics which controls the charging electrical power to the condenser bank. This arrangement allows the present invention to realize improvements in fuel economy and reductions in the running costs of a hybrid drive device.

8 Claims, 1 Drawing Sheet

HYBRID DRIVE DEVICE

FIELD OF THE INVENTION

This invention relates to a hybrid drive device combining an engine and an electrical motor as the prime mover for a vehicle.

BACKGROUND OF THE INVENTION

A hybrid drive device is known in which an electrical motor is driven to operate a vehicle with the electrical power generated by a generator which is driven by an engine. A hybrid vehicle improves exhaust emission performance and vehicle fuel economy by use of this type of drive device.

Many such hybrid drive devices use a secondary battery as a storage device charged by the excess electrical power of the generator. However since a secondary battery displays poor charging/discharging characteristics, desired fuel economy performance resulting from the regeneration of braking energy is not realized. Regeneration of braking energy is controlled to effectively utilize energy generated by the electrical motor using vehicle inertia during braking. Thus efficient storage of generated power is important. On the other hand, the secondary battery must be replaced at fixed intervals generally since the component life of the battery is short. This in turn increases the component running costs.

Tokkai-Hei 6-209501 published by the Japanese Patent Office in 1994 discloses a hybrid drive device in which a condenser is used as a storage device to drive a motor. However a storage device with the required capacity to drive the vehicle has a weight or a volume which exceeds the limited storage space available in the vehicle. This is due to the fact that the condenser has a low energy density.

SUMMARY OF THE INVENTION

The present invention has the object of providing a hybrid drive device which efficiently uses the electrical power generated by a generator. A further object of the present invention is to provide a hybrid drive device having low running costs. Yet a further object of the present invention is to provide a hybrid drive device which facilitates storage of components in the limited space available in a vehicle.

A hybrid drive device according to the present invention comprises a generator which is driven by an engine, a storage device which stores generated electrical power from the generator, and an electrical motor which is driven by the electrical power of the storage device and/or the electrical power of the generator. The invention is characterized in that the storage device is provided with a bank of condensers formed by the connection of a plurality of condenser cells in series, and that a parallel monitor is connected in parallel to each condenser cell, the parallel monitor bypassing a charging current when the respective terminal voltages exceed a fixed value.

In this manner, even when the size of the electrostatic capacity or the leakage current of each condenser cell displays large variations, it is possible to charge or discharge each condenser cell equally. In the arrangement provided with a parallel monitor, since it is not necessary to provide for a leeway with respect to a dielectric voltage in consideration of the voltage variation between condenser cells, several tens of percent downsizing of condenser in terms of electrostatic capacity is possible, in comparison with an arrangement not provided with a parallel monitor. Although the dielectric voltage per cell in the condenser is small, the voltage value is increased to a required level by connecting a plurality of such cells in series.

According to the present invention, the storage device is provided with switching converter. The switching converter has fixed current output characteristics and controls a charging current to the condenser bank. Generally a condenser is charged by a fixed voltage power source with half the charging power being lost as heat which results from resistance between the power source and the condensers. In contrast, according to the present invention, the switching converter controls the charging power to the condensers with a fixed current output. As a result, even when charging is performed with a large current which is generated by the electrical motor during regeneration of braking energy, a high charging efficiency of greater than or equal to 90% is achieved. This therefore results in conspicuous improvement to fuel economy performance of the drive device.

Since the condenser is not a fixed voltage device and its state of charge (SOC) is obtained accurately from its voltage, it is possible to perform effective control of the generator based on the state of charge. Furthermore since the charge/discharge cycle life of a condenser is long, component replacement is not required for long periods of time. That is to say, running costs are considerably lower than those associated with a secondary battery.

The hybrid drive device described above can be adapted to a hybrid vehicle. The hybrid vehicle comprises generator which is driven by an engine, a storage device which stores generated power from the generator, and an electrical motor which is driven with the electrical power of the storage device and/or the electrical power of the generator and which drives the drive wheels of the vehicle. The hybrid vehicle is characterized in that a switching converter, a parallel monitor, and a condenser bank are provided as a storage device in the same manner as above. The hybrid vehicle further comprises a controller which detects a state of charge of the storage device and the required drive power of the vehicle and which controls the generated amount of power by the switching converter and the engine.

The controller controls the switching converter so that a motor output is obtained which corresponds to the required drive force. Furthermore the controller controls the engine, that is to say, the generated amount of the generator so that the state of charge is maintained to a suitable value. In this manner, it is possible to maintain a suitable state of charge under normal conditions although the drive device always outputs a drive force which is required by the vehicle.

Furthermore the switching converter displays fixed voltage output characteristics having a wide operating range corresponding to condenser characteristics in which the terminal voltage is reduced to zero as a result of power discharge. This allows more efficient use of stored electrical power. Since the electrical power of the condenser is proportional to the square of the terminal voltage, for example if the switching converter functions up to ½ of the rated output voltage, up to 75% of the stored power can be used. Otherwise if the switching converter functions up to ¼ of the rated output voltage, up to 94% of the stored power can be used. Thus it is possible to obtain a high power utilization efficiency even when performing discharge of large current during acceleration or the like by controlling the operation of the switching converter in response to drive power requirements of the vehicle.

Furthermore mounting of the hybrid drive device in a vehicle is facilitated since the weight and the volume of the storage device are reduced by adapting an electrical double-layer condenser which has a large electrostatic capacity as a condenser cell.

DESCRIPTION OF THE PREFERRED EMBODIMENTS

Figure 1:
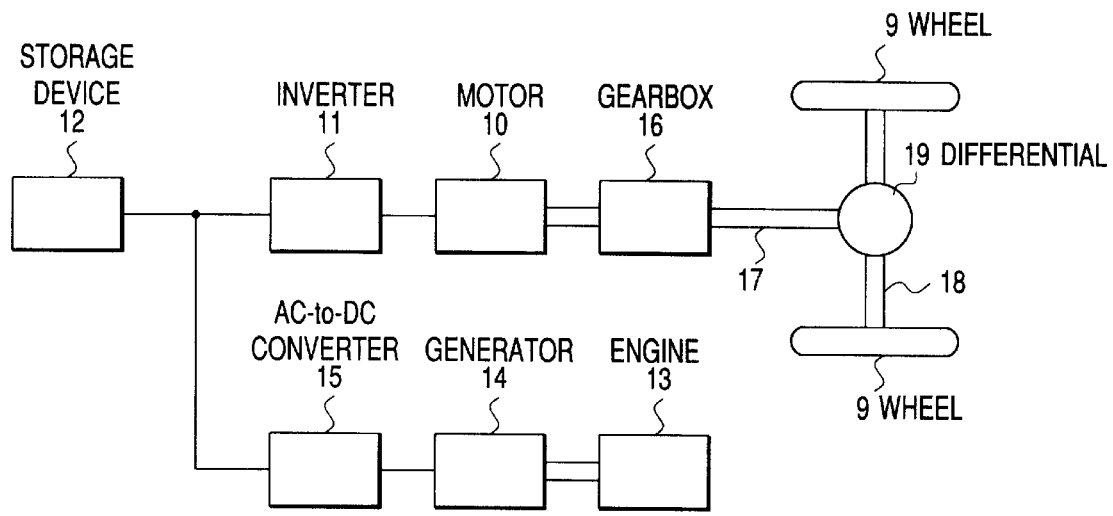
FIG. 1 is a schematic diagram of an embodiment of the present invention applied to a hybrid vehicle.

FIG. 1 is a schematic diagram of an embodiment of the present invention applied to a hybrid vehicle. As shown in the figure, a drive shaft of the generator 14 is connected to the output shaft of the engine 13 used for power generation. An alternating current generated by the generator 14 is converted to a direct current by a converter 15 and output as a charging current to the storage device 12 which is described below. Alternatively the current is output as a drive current to the electrical motor 10.

A differential gear 19 is provided between left and right axle shafts 18—18 which are mounted on respective drive wheels 9. The output shafts of a gearbox 16 and a propeller shaft 17 are connected to the input shaft of a differential gear 19. The input shaft of the gear box 16 is connected to a drive shaft of the electrical motor 10. The gear box 16 reduces the rotation speed of the electrical motor 10 to a fixed gear ratio, and transmits these rotations to the propeller shaft 17. The electrical motor 10 is driven by an AC current from an inverter 11. The output of the electrical motor 10 is transmitted to the drive wheels 9 via the gearbox 16, the propeller shaft 17, the differential gear 19 and the axle shafts 18.

Figure 2:
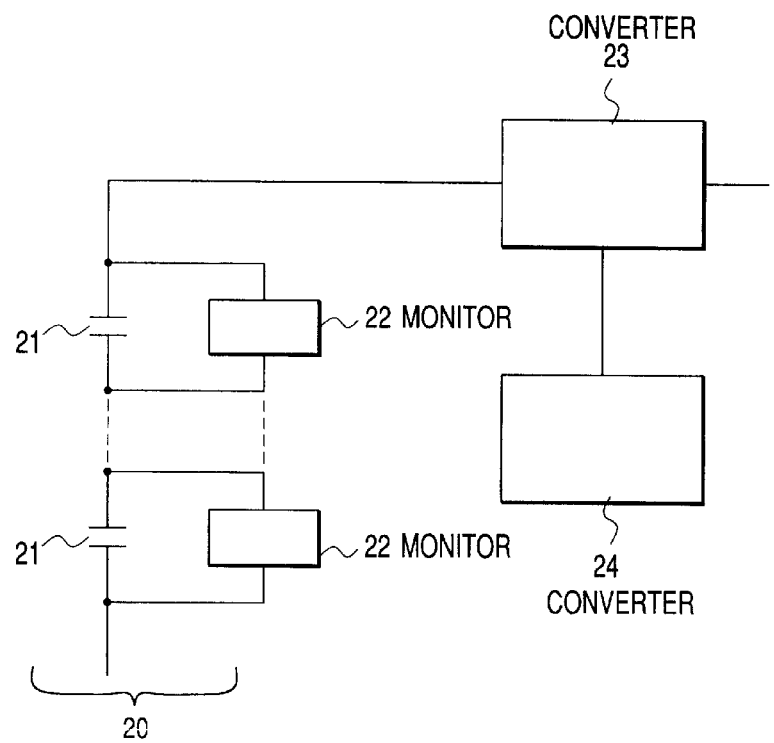
FIG. 2 is a schematic diagram of an embodiment of the storage device.

The storage device 12 comprises a condenser bank 20 formed by connecting a plurality of condenser cells 21 in series to as shown in FIG. 2, parallel monitors 22 which are respectively added to each condenser cell 21, and a bi-directional switching converter 23 which controls charging/discharging of the condenser bank 20.

The parallel monitor 22 is a circuit which monitors the terminal voltage of the condenser 21 and in which a current flows so that the condenser 21 is bypassed when a condenser terminal voltage exceeds a fixed value. The parallel monitor 22 is attached to each condenser cell 21. The parallel monitor 22 and the condenser cell 21 are connected in parallel.

The switching converter 23 has fixed current output characteristics when controlling the charging current to the condenser bank 20 and fixed voltage output characteristics in a wide operating range when controlling the discharge current from the condenser bank 20. The switching converter 23 controls the discharge current with a controller 24 in response to the drive force required by the vehicle. The required drive force is represented by the depression amount of the accelerator pedal for example.

An electrical double-layer condenser with a large electrostatic capacity is used as the condenser cell 21. Although one condenser cell has a small dielectric voltage, the required- dielectric voltage is obtained by connecting a plurality of such cells in series. Many condenser cells 21 may be connected in series-parallel as a condenser bank 20.

The controller 24 controls the regeneration of braking energy and the drive force of the vehicle. The state of charge (SOC) of the storage device 12, the braking state, and the depression amount of the accelerator pedal of the vehicle are input as required detection signals for the controller 24 to perform various types of control.

This type of structure allows the storage device 12 to be charged with electrical power generated by the electrical motor 10 during regeneration of braking energy or with excess electrical power of the generator 14. The stored electrical power is supplied to the electrical motor 10 when a large amount of power is required during vehicle acceleration or the like. The condenser 21 reduces the terminal voltage towards a value of zero as power is discharged. However the switching converter 23 which has a wide operating range controls the discharged power with fixed voltage output characteristics. As a result, it is possible to use the stored power of each condenser 21 with high efficiency.

For example, if the switching converter 23 functions up to ½ of the rated output voltage, up to 75% of the stored power can be used. Otherwise if the switching converter 23 functions up to ¼ of the rated output voltage, up to 94% of the stored power can be used. Thus it is possible to obtain a high power utilization efficiency even when performing discharge of a large current such as during acceleration or the like by controlling the operation of the switching converter 23 in response to the drive power requirements of the vehicle.

The stored power Ec of the condenser 21 is expressed by the following Equation (1):

$$Ec = \tfrac{1}{2}CV^2 \qquad (1),$$

where C is electrostatic capacity and V is voltage.

When the condenser is charged by a fixed voltage power source, the power Ep is expressed by the following Equation (2):

$$Ep = QV = CV^2 \qquad (2),$$

where Q is the electrical charge.

The ratio Ec/Ep of the charging power Ep and the stored power Ec, that is to say, the charging ratio is 50% from Equations (1) and (2). Since the condenser is not a fixed voltage device such as a secondary battery, when charged by a fixed voltage, half the charging current is lost as heat due to resistance components between the condenser and the battery. In contrast, the switching converter 23 in the present embodiment controls the charging current to the condenser 21 to a fixed current output. As a result, even when charging is performed with a large current generated by the electrical motor 10 during regeneration of braking energy, a high charging efficiency of greater than or equal to 90% is obtained and it is possible to increase fuel economy performance by regeneration of braking energy.

In comparison to connecting the condenser directly to the load, for example, in order to assist the battery during peak output, current fluctuations are reduced when the charging current is controlled with a bi-directional switching converter 23. A condenser is obtained with an energy density which is greater than 10 to 15 Wh/kg by using an activated carbon electrode which maintains the electric charge and by increasing the thickness of the electrodes through allowing increases in the internal resistance of the condenser. Since a large electrical double-layer condenser with a large electrostatic capacity is thus used as a condenser 21, the storage device 12 can be downsized to a weight and a volume which is easily stored in the limited space available in a vehicle.

According to this embodiment, since respective parallel monitors 22 are provided in each condenser 21, it is possible to perform equivalent charging or discharging operations on each condenser 21 irrespective of variations in the leakage current and the electrostatic capacity of each condenser 21. As a result, since it is not necessary to allow for a voltage leeway with respect to the dielectric voltage in consideration of the voltage variation between condensers 21, several tens of percent downsizing of condenser in terms of electrostatic capacity is possible.

Once charging has been completed to a voltage level at which the parallel monitor 22 operates, charging/discharging to each condenser 21 starts from the voltage level. As a result, since opportunities to operate the parallel monitor 22 during charging or discharging are naturally reduced, power loss resulting from the parallel monitor 22 bypassing the current is reduced.

It is desirable for the hybrid vehicle drive device to perform control operations on the charging/discharging amount of the storage device 12 so that the state of charge SOC is normally in a suitable range. Although a lithium-type battery allows relatively accurate determination of the state of charge SOC on the basis of the battery voltage, in general many types of secondary batteries do not allow highly accurate determination of the state of charge SOC as a result of being fixed voltage devices. In contrast, since a condenser has the relationship of the state of charge SOC to the voltage as defined by Equations (1) and (2), it is possible to perform accurate detection of the state of charge SOC from the voltage. Thus according to the present embodiment, the state of charge SOC of the storage device 12 can be accurately analyzed, and it is possible to control the operation of the engine 13 which drives the generator 14 accurately. As a result, it is possible to improve the performance characteristics and the fuel economy of the vehicle.

Since the cycle life concerning the charging/discharging of the condenser 21 is longer than a general vehicle cycle life, it is almost never necessary to replace the condenser 21 during the life of the vehicle. That is to say, the condenser 21 entails much lower running costs for the drive device in comparison to a secondary battery. When the input voltage range of the inverter 11 is wide, it is possible to use a switching converter without fixed voltage output characteristics with respect to discharging.

What is claimed is:

1. A hybrid drive device having a generator which is connected to an engine for driving the generator and to a first converter for converting an alternating current generated by the generator to direct current for charging a storage device connected to the first converter, and an inverter which is connected to the first converter and the storage device and which converts alternating current generated by an electrical motor during regenerating operation to direct current for charging the storage device,
   wherein the electrical motor is connected to the inverter and is driven by electrical power from the storage device and/or electrical power from the generator, and
   wherein the storage device includes:
      a condenser bank having a plurality of condenser cells connected in series;
      a plurality of parallel monitors, each parallel monitor being connected in parallel to a corresponding one of the condenser cells, monitoring a terminal voltage of the corresponding condenser cell, and conducting a direct current so as to bypass the corresponding condenser cell if the terminal voltage of the corresponding condenser cell exceeds a fixed voltage; and
      a second converter, the second converter being a bi-directional switching converter which is connected in series with the condenser bank and which controls the direct current for charging the condenser bank to a fixed current.

2. The hybrid drive device according to claim 1, wherein the second converter of the storage device further controls a discharge voltage of the condenser bank to a fixed voltage.

3. The hybrid drive device according to claim 1, wherein each condenser cell of the storage device is an electrical double-layer condenser.

4. The hybrid drive device according to claim 3, wherein an energy density of each condenser is greater than 10 Wh/kg.

5. A hybrid drive device for use in a hybrid vehicle, the hybrid vehicle having a generator which is connected to an engine for driving the generator and to a first converter for converting alternating current generated by the generator to direct current for charging a storage device connected to the first converter, and an inverter which is connected to the first converter and the storage device and which converts an alternating current generated by an electrical motor during regenerating operation to direct current for charging the storage device,
   wherein the electrical motor is connected to the inverter and drives at least one wheel of the hybrid vehicle with electrical power from the storage device and/or electrical power from the generator; and
   wherein the storage device includes:
      a condenser bank having a plurality of condenser cells connected in series;
      a plurality of parallel monitors, each parallel monitor being connected in parallel to a corresponding one of the condenser cells, monitoring a terminal voltage of the corresponding condenser cell, and conducting a direct current so as to bypass the corresponding condenser cell if the terminal voltage of the corresponding condenser cell exceeds a fixed voltage;
      a second converter, the second converter being a bi-directional switching converter which is connected to the condenser bank and which controls the direct current for charging the condenser bank to a fixed current; and
      a controller which detects a state of charge in the storage device and required power for driving the vehicle and which controls the second converter to supply power for the electrical motor corresponding to the required power for driving the vehicle, the controller further controlling the engine to maintain the state of charge to a suitable value.

6. The hybrid drive device according to claim 5, wherein the second converter of the storage device further controls a discharge voltage of the condenser bank to a fixed voltage.

7. The hybrid drive device according to claim 5, wherein each condenser cell of the storage device is an electrical double-layer condenser.

8. The hybrid drive device according to claim 5, wherein the storage device is charged with electrical power generated by the electrical motor during regeneration or with excess electrical power of the generator, and the stored electrical power in the storage device is supplied to the electrical motor when a large amount of power is required during vehicle acceleration.

* * * * *